United States Patent
Pickering

[15] 3,664,054
[45] May 23, 1972

[54] FISHING RIG AND MEANS FOR HANDLING SAME

[72] Inventor: John J. Pickering, 102 Barrett Ave., North Providence, R.I. 02903

[22] Filed: May 1, 1970

[21] Appl. No.: 33,656

Related U.S. Application Data

[63] Continuation-in-part of Ser. No. 726,520, May 3, 1968, Pat. No. 3,525,173.

[52] U.S. Cl....................................43/19, 43/25.2, 43/27.4, 43/42.72, 43/43.12, 43/43.15, 43/44.96, 43/44.98
[51] Int. Cl......................................A01k 91/02, A01k 95/00
[58] Field of Search.......................43/19, 20, 21.2, 44.98, 23, 43/43.15, 54.5, 27.4, 44.96, 18 R, 43.12

[56] References Cited

UNITED STATES PATENTS

| | | | |
|---|---|---|---|
| 2,267,285 | 12/1941 | McCrave | 43/42.72 |
| 2,218,946 | 10/1940 | Barnett | 43/42.72 |
| 2,725,842 | 12/1955 | Norris et al. | 43/44.96 UX |
| 2,808,043 | 10/1957 | Lombard | 43/19 |
| 3,302,320 | 2/1967 | Breeden | 43/18 R |
| 1,782,449 | 11/1930 | Siebert | 43/44.96 |
| 2,326,876 | 8/1943 | Miller | 43/43.12 |
| 2,685,283 | 8/1954 | Bucklin | 43/18 R X |

FOREIGN PATENTS OR APPLICATIONS

| | | | |
|---|---|---|---|
| 680,554 | 10/1952 | Great Britain | 43/44.96 |

Primary Examiner—Samuel Koren
Assistant Examiner—G. M. Yahwak
Attorney—Berman, Davidson and Berman

[57] ABSTRACT

A fishing rig comprising: a length of elastic line having a self-anchoring sinker attached to one end. The elastic line is spliced to a length of conventional line at the end of the elastic line opposite the sinker. One or more hooks are attached to the conventional line adjacent its junction with the elastic line.

The means for handling the rig aforesaid comprises a reel on which the two lines are stored with a downwardly projecting handle capable of being inserted in a socket provided in a gunwale of a boat or dug into the beach, if the fishing rig is to be cast in the manner of a handline.

5 Claims, 11 Drawing Figures

Patented May 23, 1972
3,664,054
2 Sheets-Sheet 1
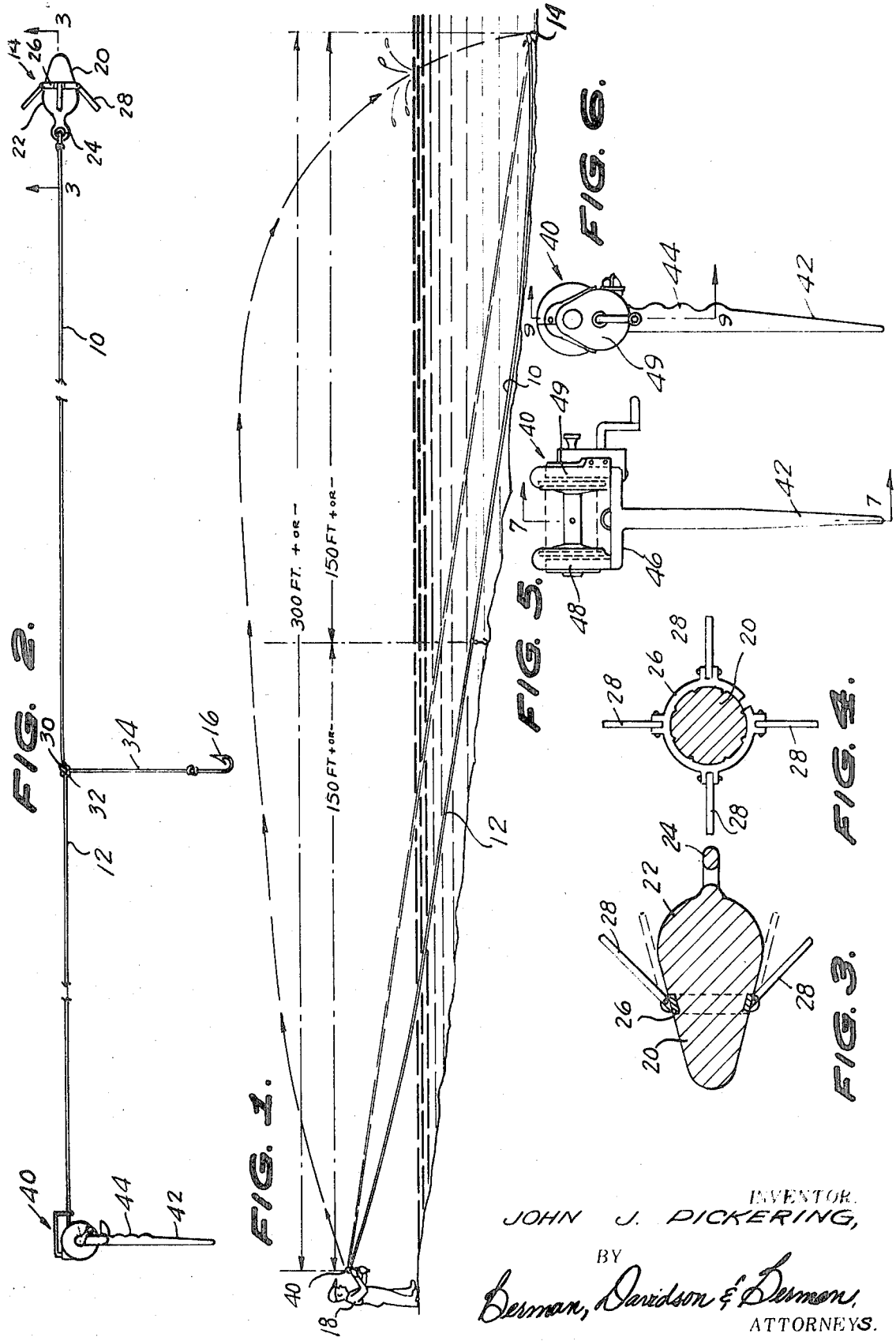
INVENTOR.
JOHN J. PICKERING,
BY
Berman, Davidson & Berman,
ATTORNEYS.

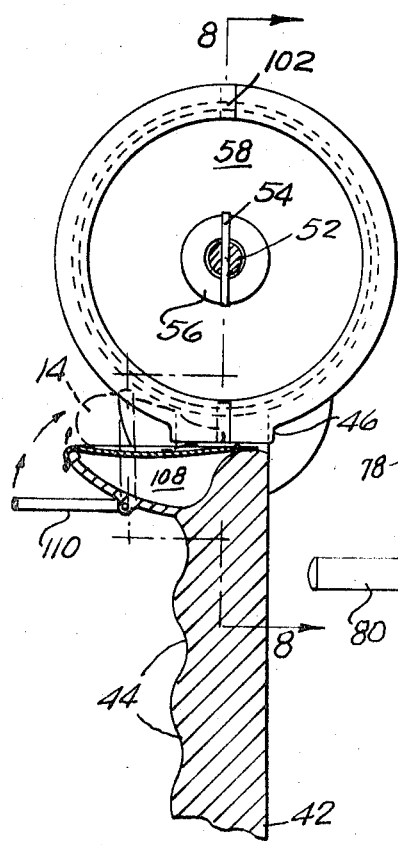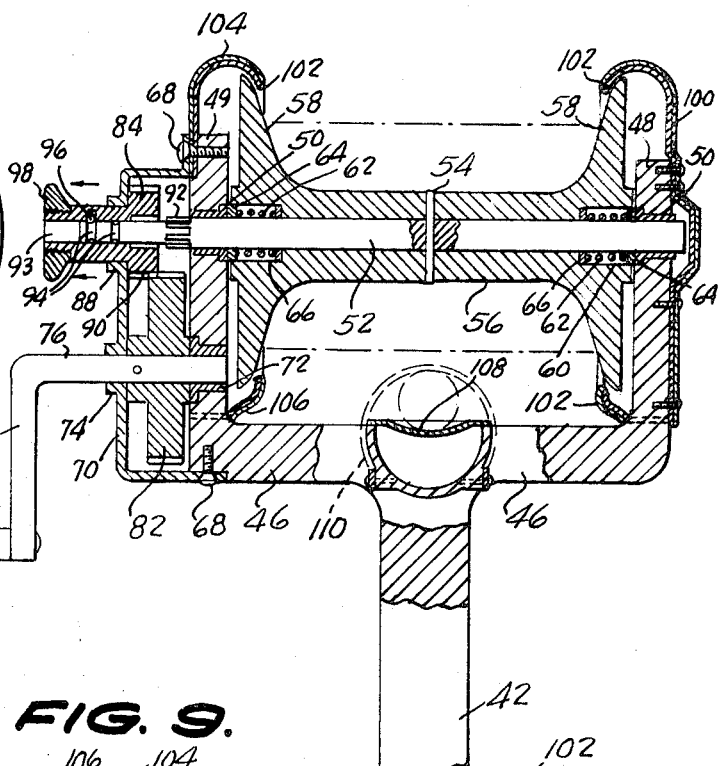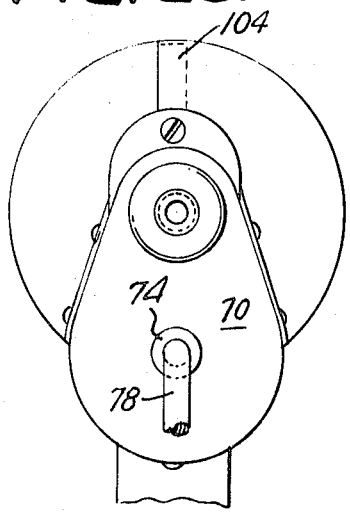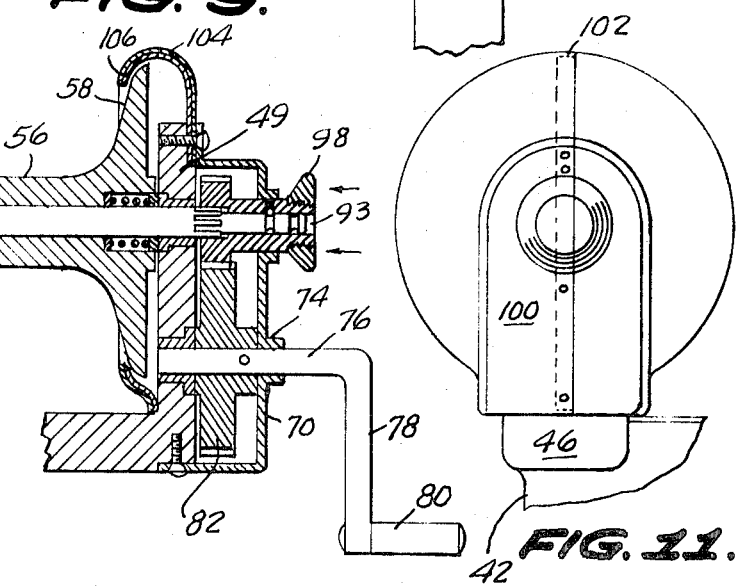
INVENTOR.
JOHN J. PICKERING,
ATTORNEYS.

FISHING RIG AND MEANS FOR HANDLING SAME

This is a continuation-in-part of my application, Ser. No. 726,520, filed May 3, 1968, now U.S. Pat. No. 3,525,173.

It is an object of this invention to provide a new and useful fishing rig in which one end of a line may be anchored at a desired spot distant from the shore or from the gunwale of a boat with the hooks placed intermediate the anchorage and the shore or gunwale and with ability to draw the hooks to shore or gunwale to disengage the fish, rebait the hook and return the hook approximately to its original location.

It is a further object of this invention to provide special means for handling such a rig as aforesaid and for using a reel to play in a sizeable fish which may be caught on the rig.

The above and other objects will be made clear from the following detailed description when taken connection with the annexed drawings, in which:

FIG. 1 is a perspective elevation showing the rig and associated tackle in use;

FIG. 2 is an enlarged view of the rig itself extended;

FIG. 3 is a section on the line 3—3 of FIG. 2;

FIG. 4 is a section on the line 4—4 of FIG. 3;

FIG. 5 is an elevation looking to the right from the left-hand end of FIG. 2;

FIG. 6 is an elevation looking from the right-hand side of FIG. 5;

FIG. 7 is a section on the line 7—7 of FIG. 5;

FIG. 8 is a section on the line 8—8 of FIG. 7;

FIG. 9 is a section on the line 9—9 of FIG. 6;

FIG. 10 is a side elevation viewed leftward from the right side of FIG. 9; and

FIG. 11 is a detailed elevation partly in section showing the storage place for a sinker to be used with the rig.

Referring now to FIGS. 1-4, the basic rig is shown in use in FIG. 1, and comprises a length of elastic line 10 joined to a length of conventional line 12. The elastic line 10 has at one end a sinker 14 while a conventional hook 16 is attached to the line 12 adjacent its juncture with the line 10. The rig is under control of the fisherman 18 and if a fish bites on the hook 16, the fisherman may draw in the hook 16 by stretching the elastic line 10 against the resistance of the sinker 14. He may then remove the fish, rebait the hook, and the elastic line 10 will restore the hook substantially to the position shown in FIG. 1.

The rig is shown in larger scale and greater detail in FIG. 2. The sinker 14 comprises a conical body portion 20 having a hemispherical end 22 to which is secured an eye 24 with the line 10 conventionally tied to the eye 24.

Referring now to FIGS. 3 and 4, the body 20 is surrounded by a band 26 to which are pivoted arms 28. These are mounted for limited pivotal movement from the dotted line position of FIG. 3 to the full line position. These legs 28 act as anchor flukes and resist pull on the eye 24 by the line 10 and therefore securely anchor the end of the line at the point where the cast leaves it. It will be noted that the ring 26 is only lightly secured to the conical body portion 20 so that if obstacles are encountered in the final retrieval of the rig, the ring 26 and its associated arms 28 will pull free, permitting retrieval of the rig even over a rough river bottom. The cost of the ring 26 and its arms 28 is minimal and, compared to the value of the rig as a whole, these parts are expendable.

The line 12 joins the line 10 by a conventional swivel joint 30 which may include an eye 32 to which the line 12 is attached as well as a leader 34 for spacing the hook 16 away from the juncture.

In FIGS. 1 and 2, the opposite end of the line 12 is shown connected to the reel generally designated 40, but since this reel may take several forms described in detail hereinafter and since the method of casting has practically nothing to do with the efficacy of the rig, consideration of these details will be reserved to later in this application. The reel is not strictly necessary. The rig could be coiled either as a handline cast or as a heaving line and the sinker 14, when properly thrown, will carry out first, line 10, and when that line tensions, then line 12 just as efficaciously useable as it can be when projected by any of the means hereinafter discussed.

The reel 40 and the associated parts are dealt with in detail in FIGS. 5-11. The reel 40 is shown as conventional but the general principles are readily adaptable to a spinning type reel, preferably of the open end type. Some form of reel, however, is desirable in most cases. As anyone who has handled a considerable length of handline fully well knows, such a line is difficult to handle and control since it cannot be effectively cast unless the line has been placed in natural coils at or near the feet of the caster, and any disturbance of these coils, as by a breeze, wandering dogs or fishing companions can be most detrimental. Particularly is this the case when the fisherman is a member of a charter party fishing in deep water.

Please note that the dimensions appearing in FIG. 1 are typical and not essential. Obviously, if one is fishing a cove or a stream only 100 feet wide, the dimensions shown in FIG. 1 would be completely excessive, however, the elastic line and the fishing line should be of substantial equal lengths.

While FIG. 1 depicts a fisherman 18 operating from the shore line, a very particular utility of the present rig occurs when a number of people are handline fishing in relatively deep water from the gunwales and fantail of a charter boat. In this case, with fishermen in close proximity one to another, the chance of disturbance and entanglement of a freely coiled line is very great indeed and the reel provides for orderly storage of the line as a fish is drawn in. It is quite usual for charter boats to provide, on the gunwales, sockets for holding rod butts and, as it appears in FIGS. 5 and 6, the reel 40 is provided with a stem 42, the upper portion of which, as best seen in FIG. 6, is provided with handhold grooves 44 so that a fisherman is able to achieve a strong grip in fighting whatever fish may attack the hook 16. This is particularly helpful in shore line fishing when the stem 42 usually will be embedded in the sand or soil of the beach between bites.

At its upper end, the stem 42 joins a horizontal member 46 which is provided at one end with a vertical member 48 and at the opposite end with a vertical member 49.

Referring now to FIGS. 7, 8 and 9, the members 48 and 49 contain bearings 50 which receive the ends of a central spindle 52 which is keyed by a central transverse pin 54 to a conventional spool 56 which has conventional flanges 58 at each end. Each of the flanges 58 has an outwardly facing recess 60. Each of the recesses 60 contains a coiled compression spring 62. One end of each spring presses against one of the bearings 50 through an inserted washer 64, while the opposite end of each spring bears on the inner end of the recess 60 through an inserted washer 66.

The member 49, shown at the left of FIG. 8 and at the right of FIG. 9, has secured thereto by screws 68 a housing 70. The member 49 has at its lower portion a bearing 72 which is aligned with a bearing 74 formed in the housing 70. The shaft 76 of a crank 78, having a handle 80, passes through the bearings 72 and 74 and is keyed to a gear 82.

The gear 82 meshes with a pinion 84 which has a hub 86 slidable in a boss 88 formed in the housing 70. Directly within the pinion 84 is a recess 90 in which are formed teeth 90 interfitting with teeth 92 formed on one end of the spindle 52. The spindle 52 has an end 93 of reduced diameter in which are formed spaced grooves 94 and a mating groove 96 is formed in the hub 86 of the pinion 84. A split ring is inserted in the groove 96 and the hub 86 of the pinion 84 may be pulled or pushed in or out by means of a handle 98 so that when in the position of FIG. 8, the split ring engages the outermost of the grooves 94 to hold the teeth in the recess 90 clear of the teeth 92 formed on the spindle 52. This permits the spool 56 to spin freely upon placing the handle 98 and hub 86 in the position of FIG. 8. In the position of FIG. 9, the spindle 52 is firmly engaged with the pinion 84 and the line may be reeled in with a multiplying action by rotation of the handle 80.

Referring to the right-hand end of FIG. 8, a housing 100 is secured to the upright member 48 and has interior flanges 102 which overlie the outer portion of the flange 58 on the spool 56. A somewhat different housing 104 is secured to the left-hand upright 49 and has flanges 106 overlying the inner periphery of the spool flange 58 at the left side of FIG. 8.

Also secured to the horizontal member 46 is a tray top 108 for receiving the sinker 14 and the tray top 108 has hinged thereto a bail 110 which may be swung to the dotted line position illustrated in FIG. 7 in which position it retains the sinker 14 in the tray top 108. Below tray top 108 is a pouch, which is to be used to store small hooks and B.B. sinkers.

No doubt numerous constructional details in addition to those illustrated and described or as modifications of those illustrated and described will occur to anyone skilled in the art who may peruse the specification. It is not intended, therefore, to limit this invention to the precise mechanical details disclosed herein.

What is claimed is:

1. A fishing rig comprising a fishing line, a line storing device connected to one end of said line, at least one fish hook secured to the outer end of said line, an elastic line having one end joined to said outer end of said fish line, and a sinker having anchor flukes secured thereto and joined to the outer end of said elastic line, said elastic line having a length and elasticity sufficient following casting with said rig, to permit said fishing line to be completely retrieved bringing said fish hook to the fisherman by stretching said elastic line, said elastic line having sufficient elasticity to pull said fish line and said hook back to their original cast position upon release of said fish line from said line storing device.

2. A device as claimed in claim 1 wherein said elastic line and said fishing line are of substantially equal lengths.

3. A device as claimed in claim 2 wherein said elastic line and said fishing line are each at least 150 feet in length.

4. A device as claimed in claim 1 wherein said elastic line extends substantially beyond said hook.

5. A device as claimed in claim 1 wherein said anchor flukes are detachably secured to said sinker to release said sinker when sufficient strain is exerted on said fish line.

* * * * *